United States Patent
Tsirkel et al.

(10) Patent No.: US 7,152,172 B2
(45) Date of Patent: *Dec. 19, 2006

(54) METHOD AND APPARATUS FOR REAL TIME MONITORING OF USER PRESENCE TO PROLONG A PORTABLE COMPUTER BATTERY OPERATION TIME

(75) Inventors: Aaron M. Tsirkel, San Jose, CA (US); Mark A. Holler, Palo Alto, CA (US); Paul T. Buchheit, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/682,231

(22) Filed: Oct. 8, 2003

(65) Prior Publication Data

US 2004/0073827 A1    Apr. 15, 2004

(51) Int. Cl.
*G06F 1/26* (2006.01)

(52) U.S. Cl. .................. 713/323; 713/310; 713/324

(58) Field of Classification Search ................ 713/300, 713/310, 323, 324; 710/8; 345/211
See application file for complete search history.

(56) References Cited

U.S. PATENT DOCUMENTS

| | | | |
|---|---|---|---|
| 5,264,992 A * | 11/1993 | Hogdahl et al. | 361/681 |
| 5,396,443 A | 3/1995 | Mese et al. | |
| 5,548,764 A | 8/1996 | Duley et al. | |
| 5,666,541 A | 9/1997 | Sellers | |
| 5,669,004 A | 9/1997 | Sellers | |
| 5,675,810 A | 10/1997 | Sellers | |
| 5,732,281 A * | 3/1998 | Summers et al. | 710/8 |
| 5,799,198 A * | 8/1998 | Fung | 713/323 |
| 5,835,083 A * | 11/1998 | Nielsen et al. | 345/211 |
| 6,002,427 A | 12/1999 | Kippust | |
| 6,233,691 B1 * | 5/2001 | Atkinson | 713/323 |
| 6,282,655 B1 * | 8/2001 | Given | 713/200 |
| 6,330,676 B1 | 12/2001 | Kelsey | |
| 6,367,020 B1 | 4/2002 | Klein | |
| 6,374,145 B1 | 4/2002 | Lignoul | |
| 6,418,536 B1 | 7/2002 | Park | |
| 6,448,978 B1 | 9/2002 | Salvador et al. | |
| 6,665,805 B1 * | 12/2003 | Tsirkel et al. | 713/323 |
| 6,734,845 B1 * | 5/2004 | Nielsen et al. | 345/211 |

FOREIGN PATENT DOCUMENTS

| | | | |
|---|---|---|---|
| JP | 7-44144 | * | 2/1995 |
| JP | 11-242733 | | 9/1999 |

* cited by examiner

*Primary Examiner*—Chun Cao
(74) *Attorney, Agent, or Firm*—Cynthia Thomas Faatz

(57) ABSTRACT

A computer is power managed by detecting the presence of a user. A camera is associated with the computer and the output from the camera is analyzed to determine if the user is present. If the user is present, then the computer is maintained in its non-power manage state. When the user leaves, however, the user's presence is no longer detected by the camera, and the power managed state can be quickly entered.

13 Claims, 2 Drawing Sheets

METHOD AND APPARATUS FOR REAL TIME MONITORING OF USER PRESENCE TO PROLONG A PORTABLE COMPUTER BATTERY OPERATION TIME

CROSS-REFERENCE TO RELATED APPLICATIONS

This application claims benefit of U.S. Patent application Ser. No. 09/472,592, filed Dec. 27, 1999, now U.S. Pat. No. 6,665,805, assigned to the assignee of the present invention.

BACKGROUND

Portable computers often include structure for reducing their power consumption in order to increase the length of time they can run based on battery power, their so-called run time. Power consumption in such a portable computer can be reduced by terminating the supply of power to various devices in the portable computer. This can include turning off the display, stopping the hard drive, and other such features. Current systems of this type have used a time out period in a register on the computer, e.g. a register in the basic input output system ("BIOS"). Each time the user takes an action on the keyboard or mouse, the BIOS counter is reset. After a user-selectable, predetermined period of inactivity, the power down mode is entered. The time before auto power down usually ranges between 30 seconds and 30 minutes.

Users often find it annoying if the screen blanks while they are taking an action such as reading the contents of the screen. Users hence often choose longer time outs to avoid this situation. However, this increases power consumption, and hence significantly decreases the battery operation time.

The present application teaches a system which recognizes that the user's passive activity, like reading, should be taken into account when determining the time-out for such a system. According to the present invention, user activity is monitored in real time by a detection device, e.g., a camera, which monitors for the presence of a user in real time. The user's presence causes the computer to remain in the "on" or fully powered state. When the user is not present, the computer reverts to its low power state.

SUMMARY

According to an aspect of the invention, a computer monitors the presence of a user, enters a power increase state when the user is present, and a power decrease state when the user is not present.

A power control device for a computer has a power control module which reduces power consumption of the computer in a specified mode; and a user detection system, which detects the presence of a user, and operates the power control module based on the presence of the user.

BRIEF DESCRIPTION OF THE DRAWINGS

These and other aspects will now be described in detail with respect to the accompanying drawings, wherein.

DETAILED DESCRIPTION

Figure 1:
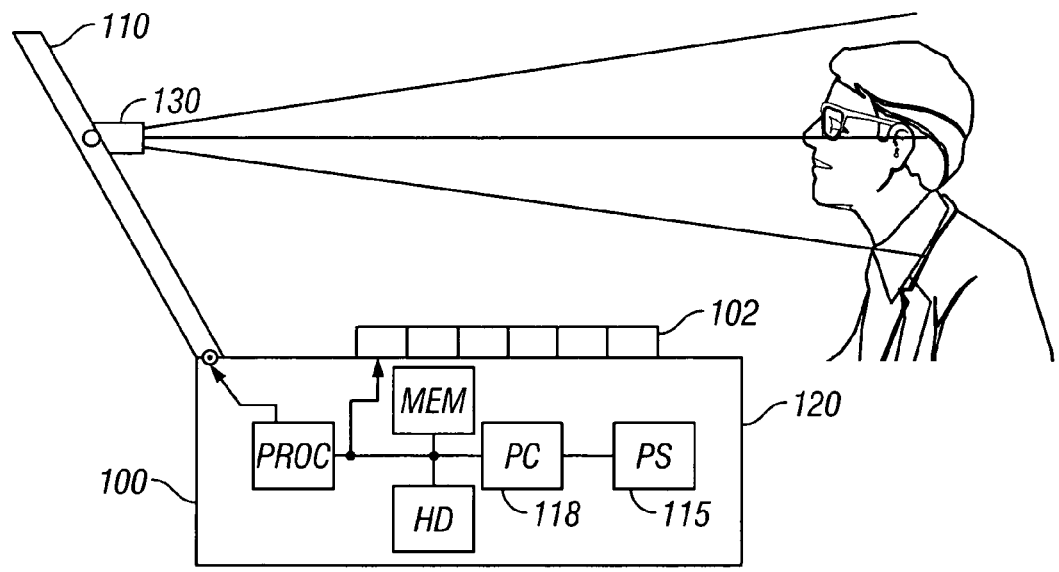
FIG. 1 shows a laptop computer with face tracking software that monitors for the presence of a user's face.

FIG. 1 shows an embodiment of a portable computer 100 using the techniques of the present invention. The portable computer 100 includes a user interface 102 which can include a keyboard and mouse, a processor 104 and memory 106. A display 110 is driven by the processor. The computer also includes a power supply 115 which produces a power output to the various components. At least one of the display 110, the processor 104, and the hard drive 112 is power controlled by a power management module 118, according to results of the system's power control flowchart. The power control can be done according to any well-known technique of power reduction during sleep state. For example, the computer can be power controlled according to the Advanced Configuration and Power Interface ("ACPI") specification, version 1.0, Jan. 6, 1997.

Other electrical functions may be necessary for the computer to operate properly. All of the parts of the computer are integrated into a housing 120.

A camera 130 is either integrated into the housing or attached thereto. The camera 130 can be a small camera, with 640×480 or comparable resolution. The camera acquires an image from the direction where the user is expected, i.e., above the keyboard. The output of the camera is connected to the processor 104, either directly or through an imaging interface chip.

Figure 2:
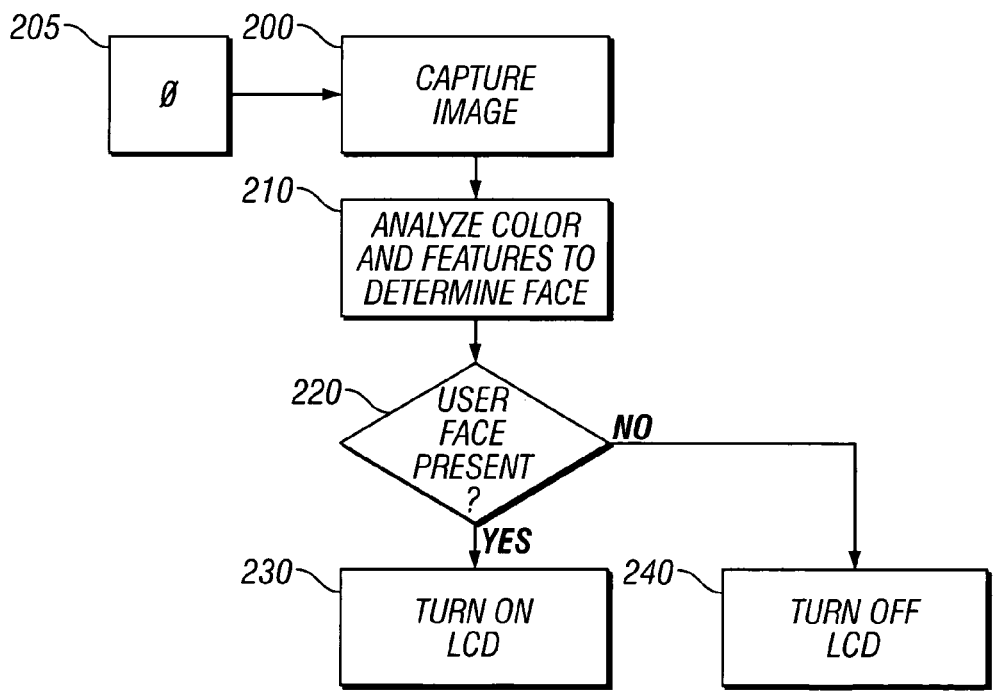
FIG. 2 shows a flowchart of operation of a first operation mode.

The operation according to a first mode is shown in the flowchart of FIG. 2.

A step 200, the camera 130 captures an image. This is done periodically under control of the clock 205. For example, the image could be captured every half second.

At step 210, the processor runs a routine based on the image to analyze the contents of the image. The color and features of the image are determined. This can use any available image processing technique to determine the presence of a face. For example, one way of doing this is by correlating a feature, which is common to a face, across the entire image.

The system can store a number of such features in a memory. This can include a number of different features which represent the shape of common eyes, nose, mouth, ears etc. Each can be correlated across the image to determine if anything that looks like an eye or nose or mouth or ear is within the field of the image.

Another option is to investigate the image, to determine an area of the right color to represent average skin tone of a user.

Step 220 carries out a decision based on whether the user's face is present. If the user's face is present, then the system ends power-reduced mode, and turns on the display at 230. If the user's face is not present, then the system turns off the display at 240.

Since the system operates in real time, the display can be switched off as soon as the user leaves. This can provide significant power saving. Even if the user sits in front the screen reading for ten minutes without checking a key, the screen will never be turned off. This also increases consumer satisfaction, since the screen will not blank while the user is watching it.

The flowchart in FIG. 2 carries out the following pseudocode.

```
WHILE (TRUE)
   {IF (USER IS DETECTED)
       {DISPLAY_STATE = ON}
   ELSE
       {DISPLAY_STATE=OFF}
   }
```

The inventor recognized, however, that monitoring the camera and vision software can itself lead to increased power consumption. A lower power camera, such as one using active pixel sensors, is preferably used to minimize power consumption.

Figure 3:
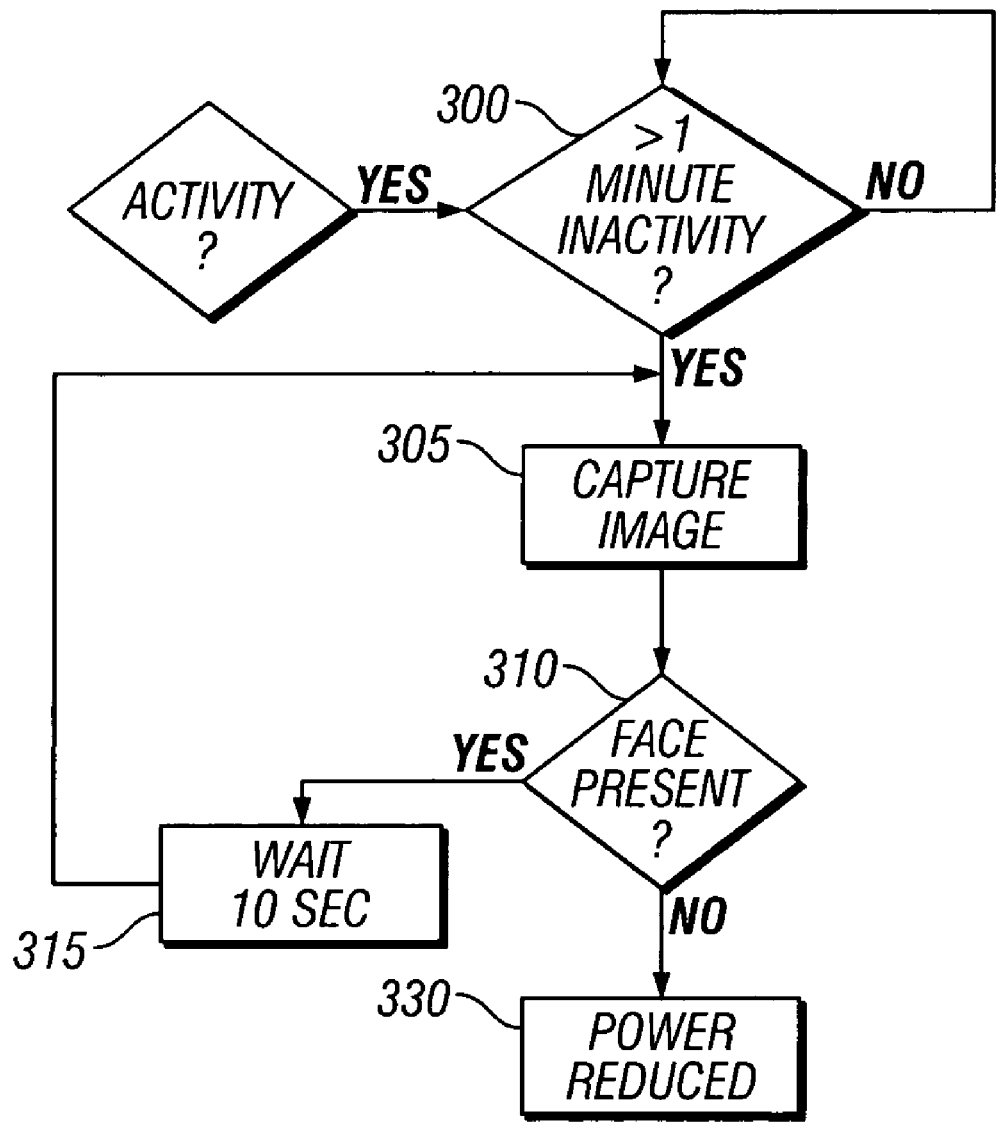
FIG. 3 shows a flowchart of operation of a second operation mode.

The operation of the second embodiment can also reduce the power consumption. Accordingly, a second embodiment is shown in FIG. 3. According to the second embodiment, the camera operation is only carried out after user inactivity for some user selectable time, e.g., one minute. After inactivity for that time, one minute, at step 300, the camera 130 captures an image at step 305. If the face is detected to be present at step 310, then a ten second timer is initiated at step 315, and the image is again captured. At any time during this flowchart, however, any activity causes a return, thus stopping the capture of images until another one minute of inactivity.

If the face is not present at step 310, then the power is reduced at step 330.

After entering the power reduced state, any user activity causes the power reduced mode to end and the user continues his operation.

This is shown in the following pseudocode.

```
WHILE (TRUE)
   WAIT FOR USER INACTIVITY /* IF THE USER IS
   ACTIVE, THEN THE SYSTEM IS IN USE */
   ACTIVATE CAMERA AND VISION SOFTWARE
   START_TIME=CURRENT_TIME ( )
   WHILE (CURRENT_TIME( ) - START_TIME < TIMEOUT AND
   USER_INACTIVITY)
       {IF (USER IS DETECTED)
           {DISPLAY_STATE=ON}
       ELSE
           {DISPLAY_STATE=OFF}
       }
   }
   DEACTIVATE CAMERA AND VISION SOFTWARE
   IF (USER_INACTIVITY)
       {DISPLAY_STATE=OFF
       WAIT FOR USER ACTIVITY
       }
   DISPLAY_STATE=ON
```

Other embodiments are contemplated.

What is claimed is:

1. A system, comprising:
   a user interaction detector to produce a signal indicative of whether a user is interacting with the system;
   a user proximity detector to determine whether a user is proximate to the system and to produce a signal indicative of user proximity, the user proximity detector being at least one of activated and deactivated responsive to the user interaction detector, the user proximity detector being deactivated in response to the signal indicative of whether a user is interacting with the system indicating that a user is interacting with the system;
   a power management module to manager power in the system, the power management module responsive to the signal indicative of user proximity; and
   a connector to receive a battery to provide power to the system, the connector in communication with the power management module.

2. The system of claim 1, wherein the user interaction detector comprises circuitry to determine whether a user is interacting with the system via at least one of a mouse and a keyboard.

3. The system of claim 1, wherein the user proximity detector comprises a camera.

4. The system of claim 3, wherein the camera comprises active pixel sensors.

5. The system of claim 1, wherein the power management module is to reduce system power consumption in response to the signal indicative of user proximity indicating that a user is not proximate to the system.

6. The system of claim 5, wherein the system further includes a display, and wherein the power management module is to reduce system power consumption by reducing an amount of power to the display.

7. The system of claim 1, wherein the system is a mobile computing system.

8. A power control device for a computer, comprising:
   user interaction circuitry to produce a signal indicative of whether a user is interacting with the computer:
   a user proximity detector being at least one of activated and deactivated responsive to the signal indicative of whether a user is interacting with the computer, when active, the user proximity detector to produce a signal indicative of user proximity to the computer, the user proximity detector being deactivated in response to the signal indicative of whether a user is interacting with the computer indicating that a user is interacting with the computer; and
   a power control module to manage power in the computer, the power management module responsive to the signal indicative of user proximity.

9. The device of claim 8, wherein the user proximity detector is activated in response to the signal indicative of whether a user is interacting with the computer indicating that a user is not interacting with the computer.

10. The device of claim 8, wherein the user proximity detector is activated in response to the signal indicative of whether a user is interacting with the computer indicating that a user is not interacting with the computer for a time equal to a user inactivity time.

11. The device of claim 10, wherein the user inactivity time is user selectable.

12. The device of claim 8, wherein the user proximity detector comprises a camera.

13. The device of claim 12, wherein the user proximity detector further comprises an image processor to receive image information from the camera and further to process the image information.

* * * * *